Jan. 15, 1946.   F. J. SALOUN   2,393,070
FISHING FLOAT
Filed June 8, 1944

INVENTOR.
FRANK J. SALOUN
BY
Christian R. Nielsen
ATTORNEY.

Patented Jan. 15, 1946

2,393,070

UNITED STATES PATENT OFFICE 2,393,070

FISHING FLOAT

Frank J. Saloun, Milwaukee, Wis.

Application June 8, 1944, Serial No. 539,320

3 Claims. (Cl. 43—49)

My invention refers to fishing floats, commonly referred to as "bobbers," and more particularly to the type of float used on a fishing line as an indicating means to determine when the bait on the hook is being attacked.

The object of my invention is to provide a float that may be easily attached to the fishing line without cutting or knotting the thread.

Another object of my invention is to provide a float that may be adjusted to any position on the fishing line without removing it, yet securing it to a fixed position by applying frictional contact at two points on the float.

A still further object of my invention is to provide a device of the character described, that may readily be removed or replaced without mechanical changes or the use of special instruments, and constructed economically and simple.

Other and further objects of my invention will become more apparent as the description proceeds when taken in conjunction with the drawing, in which.

Figure 1:
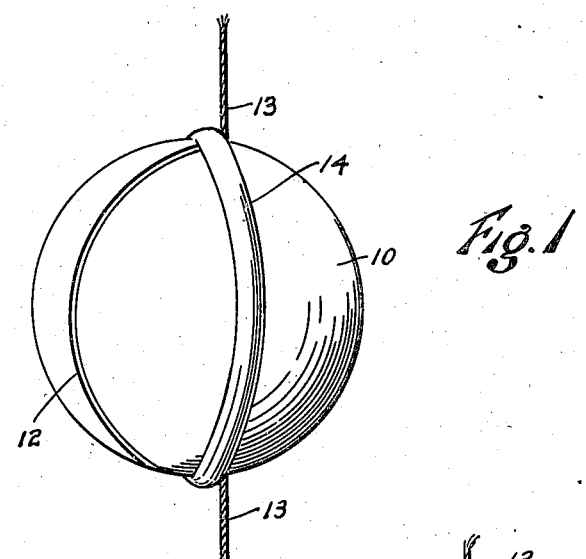
Figure 1 is a perspective view of the device, assembled complete with the fishing line.
Figure 2:
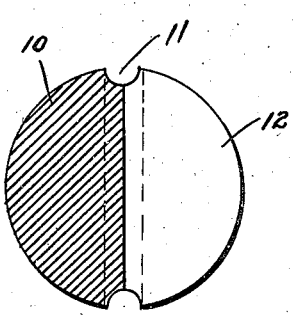
Figure 2 is a cross sectional view of the body of the device.

Similar characters of reference indicate corresponding parts throughout the several views, and referring now to the same, the character 10 shows a spherical body, constructed of cork, wood, or any material affording buoyancy to permit its floating on the top of the water, encircled at its periphery by a semicircular groove 11. There is a slot 12 cut half way through the body 10 to a point equivalent to the center of the groove 11 at its lowest point. The slot 12 is of a width sufficient to accommodate and receive a fish line shown as 13.

Engaging the semicircular groove 11 is a band 14, made of a resilient material, such as rubber or the like, and shaped to a contour to fit the radial contour of the groove 11, and encircling the periphery of the body 10 within the groove 11.

Figure 3:
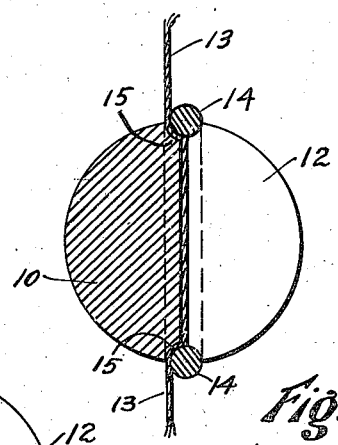
Figure 3 is a similar view as shown in Figure 2, but of the entire assembled device as shown in Figure 1, illustrating the manner of frictional contact with the fishing line at two places.
Figure 4:
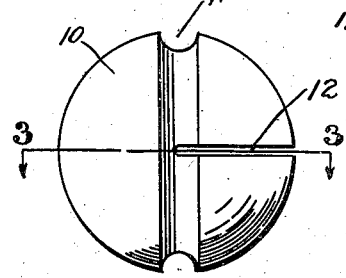
Figure 4 is a top view of the body of the device.
Figure 5:
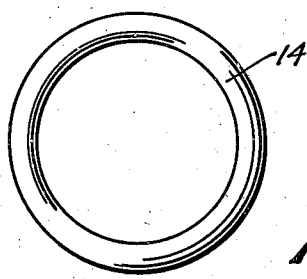
Figure 5 is a plan view of the resilient band.

In operation, the device functions as follows:

The fish line 13 is inserted into the slot 12 in the body 10, and the resilient band 14, having an inside diameter smaller than the periphery of the body, is expanded and forced over that portion of the body 10, in which the slot 12 is cut until it engages the semicircular groove 11, thereby forcing the fish line 13 against the wall of the groove 11 at the two points 15 as shown in Figure 3. This will supply frictional contact of the fish line 13 with the band 14 and the wall of the groove 11 at the two points 15, and allows the entire assembly to be frictionally supported at any predetermined place on the fish line 13. This is a feature that is very desirable, for in the art of fishing, it is imperative that the bait on the hook at the extreme end of the fishing line must be supported at a pre-determined depth and the float on the surface of the water must be adjusted to conform with this desired position of the hook and bait. My device provides this feature without injuring the line in any way, yet permitting the line to stay intact and maintain a vertical position through the float at all times.

While I have shown and described in detail the various parts constituting the device, and the assembly of these parts, I do not wish to confine myself to the specific construction shown, for in the embodiment of my invention, there are many minor details that may be changed, and I reserve the right to make such changes without departing from the spirit of the invention or the scope of the appended claims.

Having thus described my invention, what I claim and desire to secure by Letters Patent in the United States is:

1. A float of the character described comprising a body, provided with a groove encircling the periphery of said body, and provided with a slot extending inwardly from the outer face of said body to a point central of said body and groove, and a resilient band having an inner diameter less than the diameter of said body at the bottom of said groove, said band adapted to encircle said body by engagement with said groove on the periphery of said body.

2. A device of the character described comprising in combination with a fishing line, a body, said body provided with a groove encircling the periphery thereof and provided with a slot extending inward from the outer face of said body to a point central of said body and groove, said slot disposed for the reception of said fishing line, and a resilient band having an inner diameter less than the outer diameter of said body at the bottom of said groove, said band encircling said body by engagement with the aforesaid groove after the fishing line is inserted into said slot, thereby causing said band to frictionally engage said fishing line at two points when said band engages said groove.

3. A device of the character described comprising a body provided with a groove encircling the periphery thereof and provided with a slot extending inwardly from the outer surface of the body to a point central of said body and groove, and a resilient band adapted to encircle said body by engagement with the aforesaid groove.

FRANK J. SALOUN.